(12) United States Patent
Northrop et al.

(10) Patent No.: US 6,908,495 B2
(45) Date of Patent: Jun. 21, 2005

(54) LOW OXYGEN ORGANIC WASTE BIOCONVERSION SYSTEM

(75) Inventors: Jere Northrop, Amherst, NY (US); James W. Morris, Standish, ME (US)

(73) Assignee: Bion Technologies, Inc., Littleton, CO (US)

(*) Notice: Subject to any disclaimer, the term of this patent is extended or adjusted under 35 U.S.C. 154(b) by 173 days.

(21) Appl. No.: 10/600,936

(22) Filed: Jun. 20, 2003

(65) Prior Publication Data

US 2004/0079698 A1 Apr. 29, 2004

Related U.S. Application Data

(62) Division of application No. 09/709,171, filed on Nov. 10, 2000, now Pat. No. 6,689,274.

(51) Int. Cl.[7] .................................................. C05F 3/00
(52) U.S. Cl. ....................................... 71/9; 71/32; 71/54
(58) Field of Search ................................. 71/9, 32, 54

(56) References Cited

U.S. PATENT DOCUMENTS

| | | | |
|---|---|---|---|
| 4,179,374 A | 12/1979 | Savage et al. | 210/151 |
| 4,292,328 A | 9/1981 | Coulthard et al. | 426/2 |
| 4,487,697 A | 12/1984 | Böhnke et al. | 210/605 |
| 4,540,666 A | 9/1985 | Nukina et al. | 435/166 |
| 4,721,569 A | 1/1988 | Northrop | 210/607 |
| 4,780,208 A | 10/1988 | Böhnke et al. | 210/605 |
| 5,078,882 A | 1/1992 | Northrop | 210/602 |
| 5,248,422 A | 9/1993 | Neu | 210/605 |
| 5,338,452 A | 8/1994 | Pidaparti | 210/188 |
| 5,447,633 A | 9/1995 | Matsche et al. | 210/605 |
| 5,472,472 A | 12/1995 | Northrop | 71/9 |
| 5,506,096 A | 4/1996 | Helmo | 435/3 |
| 5,538,529 A | 7/1996 | Northrop | 71/9 |
| 5,603,744 A | 2/1997 | Kuerner | 71/9 |
| 5,700,370 A | 12/1997 | Helmo | 210/94 |
| 5,733,454 A | 3/1998 | Cummings | 210/603 |
| 5,755,852 A * | 5/1998 | Northrup | |
| 5,783,081 A | 7/1998 | Gaddy | 210/603 |
| 5,906,746 A | 5/1999 | Helmo et al. | 210/614 |
| 6,013,512 A | 1/2000 | Turschmid et al. | 435/266 |
| 6,068,774 A | 5/2000 | Vandenbergh et al. | 210/611 |
| 6,087,159 A | 7/2000 | Finn | 435/299.1 |
| 6,106,716 A | 8/2000 | Berkman | 210/603 |
| 6,190,566 B1 | 2/2001 | Kolber | 119/447 |
| 6,312,599 B1 | 11/2001 | Reid | 210/605 |
| 6,350,350 B1 | 2/2002 | Jensen et al. | 162/141 |
| 6,689,274 B1 * | 2/2004 | Northrup et al. | |

FOREIGN PATENT DOCUMENTS

| | | |
|---|---|---|
| GB | 1245434 | 9/1971 |
| WO | WO9010083 | 7/1990 |

OTHER PUBLICATIONS

Astrid A. Van de Graaf et al., "Autotrophic growth of anaerobic ammonium–oxidizing micro–organisms in a fluidized bed reactor," Microbiology (UK), 142:2187–2196 (1996).

(Continued)

Primary Examiner—Chester T. Barry
(74) Attorney, Agent, or Firm—Kenyon & Kenyon

(57) ABSTRACT

The present invention is directed to a substantially odorless biological treatment process for solid and liquid organic wastes. The present invention also provides for a novel nutrient rich humus material produced from the biological treatment process. The bioconversion process of the present invention results from low oxygen concentrations and high quantities of microorganisms in a diverse microbial community.

8 Claims, 3 Drawing Sheets

OTHER PUBLICATIONS

Metcalf & Eddy, "Wastewater Engineering—Treatment, Disposal, Reuse (Third Edition)" p512–518 (1991).

M. Fuerhacker et al., "Approach for a novel control strategy for simultaneous nitrification/denitrification in activated sludge reactors," Water Research, 34 (9):p2499–2506 (Jun. 2000).

C. Collivignarelli et al., "Simultaneous nitrification–denitrification processes in activated sludge plants: Performance and applicability," Water Science and Technology, 40 (4–5): p187–194 (Aug.–Sep., 1999).

Klangduen Pochana et al., "Study of factors affecting simultaneous nitrification and denitrification (SND)," Water Science and Technology, 39 (6): p61–68 (Mar. 1999).

Hong W. Zhao et al., "Controlling factors for simultaneous nitrification and denitrification in a two–stage intermittent aeration process treating domestic sewage," Water Research, 33 (4): p961–970 (Mar. 1998).

Hyungseok Yoo et al., "Nitrogen removal from synthetic wastewater by simultaneous nitrification and denitrification (SND) via nitrite in an intermittently–aerated reactor," Water Research, 33 (1): p145–154 (Jan., 1999).

Bent Halling–Sorensen et al., "A model of nitrogen removal from waste water in a fixed bed reactor using simultaneous nitrification and denitrification (SND)," Ecological Modelling, 87 (1–3): p131–141 (1996).

Anders O. Wistrom et al., "Enhanced nutrient removal by limiting dissolved oxygen concentration in a continuously fed, intermittently decanted, activated sludge plant," Environmental Technology, 17(4): p371–380 (1996).

Elisabeth V. Munch et al., "Simultaneous nitrification and denitrification in bench–scale sequencing batch reactors," Water Research, 30 (2): p277–284 (1996).

Eberhard Bock et al., "Nitrogen loss caused by denitrifying Nitrosomonas cells using ammonium or hydrogen as electron donors and nitrite as electron acceptor," Archives of Microbiology, 163 (1): p16–20 (1995).

Chung–Min Liao et al., "Nitrification/denitrification in an intermittent aeration process for swine wastewater," Journal of Environmental Science and Health Part B Pesticides Foods Contaminants and Agricultural Wastes, 29 (5): p1053–1078 (1994).

G. Bortone et al., "Nitrification and denitrification in activated–sludge plants for pig slurry and wastewater from cheese dairies," Bioresoure Technology, 37 (3): p243–252 (1991).

F. Carta et al., "Aerobic purification of dairy wastewater in continuous regime; reactor with support," Process Biochemistry, V34, N6–7 (SEP),p613–619 (1999).

F. Beline et al., "Factors affecting nitrogen transformations and related nitrous oxide emission from aerobically treated piggery slurry," Journal of Agricultural Engineering Research, V73, N3 p235–243 (Jul. 1999).

K. Yoo et al., "Nitrogen removal from synthetic wastewater by simultaneous nitrification and denitrification (SND) via nitric in an intermittently–acrated reactor," Water Research, V33, N1 p145–154 (Jan. 1999).

C. Helmer et al., "Simultaneous nitrification/denitrification in an aerobic biofilm system," Water Science and Technology, V37, N4–5,p183–187 (1998).

S. Okabe et al., "Relationship between population dynamics of nitrifiers in biofilms and reactor performance at various C:N ratios," Water Research, V30, N7 p1563–1572 (Jul. 1996).

JR Bicudo et al., "Intermittent aeration of pig slurry—farm scale experiments for carbon and nitrogen removal," Water Science and Technology, V32, N12, p83–90 (1995).

Y. Watanabe et al., "Simultaneous removal of organic materials and nitrogen by micro–aerobic biofilms," Water Science and Technology V31, N1, p195–203 (1995).

I. F. Svoboda et al., "Nitrogen removal from pig slurry by nitrification and denitrification," American Society Agricultural Engineers Seventh International Symposium on Agric. & Food Processing Wastes p24 (Jun. 18–20, 1995).

H. Bennermann et al., "Simultaneous nitrification and denitrification in a single step unit," Conference Title: DECHEMA biotechnology conferences—Lectures at the 7th DECHEMA annual meeting of biotechnologists, Frankfurt arn Main, Germany, p1011–1014 (May 30–31, 1989).

J. Dufay et al., "Simultaneous nitrification/denitrification in constructed wetlands," Joint Conference on the Environment, p85–90 (Mar. 1988).

K.M. Ho et al., "The importance of simultaneous nitrification–denitrification in Biological Nutrient Removal activated Sludge Systems with low F/M bulking control," Australian Conference on Biological Nutrient Removal from Wastewater, 1994; 2nd p365–374 (AWWA) (1995).

H. Hvidtfeldt Rasmussen et al., "Treatment of odorous nitrogen compounds in a bioscrubber comprising simultaneous nitrification and denitrification," Symp. On Biological Waste Gas Cleaning, Heidelberg, Germany, (Mar. 9–11, 1994).

Hao Xiaodi, et al., "Removing nitrate and ammonium from drainage water by simulation of natural biological processes" Water Research v. 32 no3 p936–943 (Mar. 1998).

P. J. Hirl, "Wastewater treatment with zero dissolved oxygen," 1998 National Conference on Environmental Engineering (Jun. 7–10, 1998).

Harald Horn, "Simultanc Nitrifikation und Denitrifikation in cincm hetero–/autotrophen Biofilm unter Berucksichtigung der Sauerstoffprofile" (English Abstract Enclosed—Simultaneous nitrification and denitrification in a hetero/autotrophic biofilm in concern to the oxygen gradient GWF (DasGas—und Wasserfach) Wasser—Abwasser (Germany) v 133:6, p287–292 (Juni 1992).

P. Harremoes et al., "Evaluation of Methods for Nitrogen and Phosphorous Control in Sewage Effluents," Journal of the Institute of Water and Environmental Management, Supplementary European Issue, p50–61 (Mar. 1992).

USEPA, Manual: Nitrogen Control (1993), Office of Research and Development, EPA/625/R–93/010, Washington, DC, p. 86–87, 101–103.

"Anaerobic Digester at Craven Farms," www.energy.state-.or.us/biomass/digester/craven.htm downloaded Jun. 20, 2002, last modified Jun. 20, 2002.

Course Syllabus, MB302 (General Microbiology, Oregon State University, Fall 2001, http://www.orst.edu/instruct/mb302/field/Lecture7/Lecutre7.htm, downloaded Jun. 20, 2002, date of last modification (unknown).

* cited by examiner

LOW OXYGEN ORGANIC WASTE BIOCONVERSION SYSTEM

CROSS-REFERENCE TO RELATED APPLICATIONS

This application is a division of U.S. patent application Ser. No. 09/709,171, filed on Nov. 10, 2000, now U.S. Pat. No. 6,689,274.

The present invention relates to a novel nutrient rich humus material produced by a process for the substantially odorless biological treatment of solid and liquid organic wastes, particularly animal farm wastes.

BACKGROUND OF THE INVENTION

Municipal wastewater treatment facilities, animal farming facilities, and organic industrial treatment and food processing facilities treat and generate highly polluting, odoriferous organic waste streams. With increasing human population density, such facilities have come under increasing pressure to upgrade, modify, or supplement their treatment processes so as to improve the air quality in and around such facilities and further protect the environment, and human and animal health. A particularly persistent problem addressed by the present invention is the treatment of animal excrement containing high concentrations of microbial substrates (nutrients such as phosphorus, sulfur and particularly nitrogen and other organic biodegradable materials as measured by the total biochemical oxygen demand (BOD) test) which, in typical animal treatment systems, not only pollute surface and subsurface water supplies, but also negatively impact air and soil quality. Further, present treatment alternatives for organic waste streams, such as animal excrement, frequently generate and exacerbate the offensive odors.

Traditionally, animal farming was accomplished on large tracts of land in remote rural areas, with the farmer accepting the offensive odors associated with animal husbandry as a necessary evil. Waste excrement generated from the animal farming was gathered and spread on the farm as fertilizer. The animal waste excrement was allowed to slowly decay in the field and a portion of the unstable nutrients, including phosphorous and nitrogen products, were generally taken up by the growing crop plants. The remainder of the bioavailable or biologically useable nutrients was assimilated by the general environment, usually with no negative ecological impact. When incorporated by plant growth, the nutrients were eventually consumed by the animals for an efficient recycling of nutrients.

Modern high-density animal farming practices, particularly modern feedlot and dairy farming practices, have detrimentally impacted the ecological balance of traditional animal farming methods. Modern agricultural practices concentrate larger numbers of animals in ever-smaller areas leaving larger amounts of waste excrement to be managed by distribution to ever decreasing land areas. In addition, the larger amounts of food required by the increasing density of animals per acre and modern intense feeding practices which use supplemental animal feed containing high concentrations of nutrients, result in larger volumes of manure which cannot be efficiently distributed by traditional methods without severe environmental impacts. Fields on which such manures have been spread become exceedingly rich in unstabilized nutrients and sludge, thereby creating a pollution hazard to water bodies and promoting emissions of repugnant odors. Rain, snow and the like falling on the soil, carry large masses of the unstabilized waste (along with accompanying odors) into the underlying soil that may then infiltrate to the underlying groundwater. The runoff created carries the substances to surface water bodies and generates airborne odors. With the flow of water through drainage ditches, groundwater movement and the like, eventually fresh water aquifers, groundwater, surface waters and other water resources become polluted.

The problem of air and water pollution caused by excessive organic wastes can be exacerbated by an accompanying concentration of toxic materials. Concentrations of toxic materials, which may have been used as animal pharmaceuticals, insecticides, and/or herbicides, including heavy metals and the like, may be part of the animal food intake. Though not generally harmful to the animal or the animal product being produced these materials may end up being further concentrated in the animal's excrement, which is in turn discharged to the local ecosystem.

Various solutions have been proposed to solve the waste management problems posed by modern animal farming, but have been judged to be incomplete, too expensive or so specialized that they only serve to change or postpone the problem.

For example, it has been proposed that complex mechanical systems be installed to provide manageable manure slurries and that systems be installed by the farmer to enable spraying the manure slurry on differing land areas in a rotating manner to reduce the impact of excrement concentration. It has also been proposed to isolate manure in depositories secure from rainwater run-off until the stabilization (decaying) process has produced a concentrated, desirable humus material that can then be commercially sold or otherwise distributed to non impacted localities. Such solutions merely allow for the natural incomplete decay of the manure as evidenced by exacerbated odor problems, require constant manpower, do not resolve the problem of migration of unstabilized waste, and require excessive amounts of time, space and money for treatment.

Conventional biological wastewater treatment technologies for domestic, industrial and animal organic wastes utilize aerobic or anaerobic bioconversion processes, with aerobic processes being the most common. Some modern treatment technologies, such as waste stabilization ponds, utilize both aerobic and anaerobic processes wherein different zones are created within a single treatment unit for each different type of microbial bioconversion. Within these systems, the aerobic zone is typically separated from the anaerobic zone by a facultative zone. Facultative zones contain bacteria that can grow and function both in the presence and absence of oxygen.

One generally successful treatment process of the prior art developed by Bion Technologies, Inc., generally known as the BION® NMS process, is a bioconversion process which transforms animal waste excrement, containing significant concentrations of total BOD and nutrients, into an ecologically stable, nutrient rich organic humus material known as BIONSOIL®. As described in U.S. Pat. No. 5,755,852, the BION® NMS process generally includes an anaerobic process in a first zone (an ecoreactor) which utilizes both anaerobic and facultative bacteria and a combination aerobic/anaerobic process which utilize aerobic, anaerobic and facultative bacteria in a second zone (a bioreactor). Alternatively, the BION® NMS process could also include a third zone (a polishing ecoreactor) wherein plants and microorganisms treat the waste.

Generally, the BION® NMS process utilizes a combination of chemical precipitation, physical settling, and natural living systems such as microbes and plants to achieve bioconversion of the waste. Specific treatment systems incorporating the BION® NMS process such as for dairy farms and hog farms are individually designed according to actual conditions but generally include one or more of the three zones; a solids ecoreactor, a bioreactor and a polishing ecoreactor.

As described in U.S. Pat. No. 5,755,852, an ecoreactor is a multi-cell composting, solids dewatering and bioconversion means. A solids ecoreactor of the BION® NMS process requires construction of a plurality of holding cells, surrounded by containment berms, generally arranged so that individual or sets of cells may be periodically taken off-line from the on-going process so that their contents may be harvested (removal of bioconverted biosolids), dewatered (physical unit process, usually mechanical, for reducing moisture content) and/or dried (reduction of water content by vaporizing water to the air) to produce a bioconverted organic humus or BIONSOIL®. Once harvested, the cell(s) are available and are eventually reactivated or placed back on-line within the bioconversion process. The principle function of a solids ecoreactor is to convert excess biomass produced by the bioreactor to an ecologically beneficial humus material.

As described in U.S. Pat. No. 5,755,852, a bioreactor is an organism growth managing, enhancing and concentrating means. The principle function of a bioreactor, which receives oxygen from the atmosphere and/or from direct, mechanically assisted, aeration, is to promote the growth of biological organisms, which utilize both the incoming soluble materials and waste stream solids converted or hydrolyzed to further the bioconversion process. A bioreactor generally comprises a suitably sized pond environment or the like. Although the bioreactor may include some aeration, multiple subenvironments exist within it which utilize aerobic, facultative and/or anaerobic bacteria. The solids ecoreactor, on the other hand, principally contains and utilizes anaerobic and facultative bacterial populations in the flowing liquid phase using the oxygen input in the bioreactor. As bacterial and other organic solids separate from the flowing liquid in the solids ecoreactor, the high solids concentration subenvironments formed contain some active facultative organisms but are predominated by anaerobic microbial populations.

A polishing ecoreactor generally comprises a flooded vegetative complex made up of plants and microorganisms. The plants and microorganisms in the polishing ecoreactor generally capture the nutrients contained in the effluent discharged from a bioreactor. Generally, the water effluent from a polishing ecoreactor is sufficiently pollutant free to allow discharge thereof into a natural receiving water or wetland. Alternatively, this clean discharge may be recycled for beneficial animal husbandry use or used for irrigation.

In the BION® NMS treatment process, wash and flushing water containing slurried animal excrement, and wasted feed, bedding and drinking water from an animal confining barn, penning area or the like, is directed to either or both a solids ecoreactor and a bioreactor. In the solids ecoreactor, non-soluble settleable and floatable solids separate and the bioconversion of the substrate begins. In the bioreactor, microorganisms are enhanced, modified and/or concentrated providing additional bioconversion.

The beneficial humus material produced by the BION® NMS process is substantially free of the objectionable odors normally associated with the animal excrement such as ammonia, hydrogen sulfide, skatole, mercaptans and other odor causing compounds. However, a significant environmental problem which is occasionally associated with the BION® NMS process, and which is usually associated with other present and past wastewater treatment processes, is odor emission from the treatment tanks, cells, or units during the treatment process. Moreover, as is the case for the BION® NMS process, this odor problem can be exacerbated when treatment processes include aeration or intense agitation or mixing which creates greater dispersion, and possibly greater volumes of odorous emissions.

Presently, treatment facilities have two options for coping with these unwanted odors. Either endure the unpleasant odors or manage them. Under the first option, where possible, treatment facilities locate open tanks or treatment process units such as aeration tanks, biological contact tanks, aeration lagoons, and the like in open fields removed from developed areas. This provides for dispersion and dilution of the odors before odor nuisance becomes problematic. Such is the case for typical animal farming treatment processes.

When a treatment facility is located near developed areas another type of passive method for coping with unwanted odors commonly used for wastewater treatment facilities in most locations is the use of buffer zones. As an example, New York City Department of Environmental Conservation suggests minimum buffer distances from developed areas (actual distances depend upon site-specific circumstances), for many treatment process units. The suggested buffer distance from an aerated lagoon is 1,000 feet. Metcalf & Eddy Inc., revised by George Tchobanoglous and Frank Burton, Wastewater Engineering Treatment, Disposal, and Reuse, $3^{rd}$ Edition 513 (1991). Although these passive techniques could be effective methods for minimizing the effects of odors on developed areas, it is more often the case that the desired distance between the treatment facility and the developed area is unavailable.

Even if the land is available to create a buffer zone, the use of buffer zones is often ineffective. Most importantly, the odors in and around the treatment tanks, vessels or the like are a nuisance, and at times a safety concern, for workers at the facilities.

The second option for treatment facilities is to manage the odors. Odor management techniques include of physical, chemical and biological processes or combinations thereof. Chemical treatment typically includes oxidizing the odor compounds with chlorine, ozone, hydrogen peroxide, or potassium permanganate or using a masking agent to disguise the odor. Physical treatment, probably the most common method, includes containment of the treatment units with covers, collection hoods and air handling equipment, followed by some form of physical treatment which could include combustion, scrubbing, and/or adsorption (with activated carbon). Biological processes include bioconversion of the odor causing compounds by some form of microorganism. Such processes include treatment of odorous air by passing it through activated-sludge aeration tanks, treatment such as disclosed in U.S. Pat. No. 6,087,159, relating to a bio-scrubber which is a cylindrical tower with a high surface area media (usually plastic) on which biological growths are maintained, or as disclosed in U.S. Pat. No. 6,068,774 relating to the addition of biological organisms such as Pseudomonas species to assimilate odor causing compounds.

While such odor treatment methodologies can be effective in treating odors they carry significant disadvantages. For example, they consume considerable amounts of energy to power additional equipment, require significant amounts of capital, often require additional real estate which is usually unavailable and scarce around facilities, and require excessive, continuous maintenance and manpower to keep them running once installed. Further, some such systems consume substantial amounts of costly chemicals or activated carbon which must be regenerated or disposed of.

Applicants have surprisingly discovered a process for the biological conversion of animal waste. This process operates at low dissolved oxygen concentrations throughout the process while maintaining high quantities of diverse populations of microorganisms. The wastewater and sludge are treated simultaneously. Thus, the present invention addresses many of the problems associated with municipal, domestic, industrial, food industry, animal husbandry and other organic wastes, by providing an attractive and efficient means to resolve ecological problems associated with the treatment of organic wastes. More specifically, the present invention addresses the odor emission problem through the efficient, substantially odorless, bioconversion of waste excrement materials or a vast array of other organic wastes into stable, economically and/or ecologically beneficial materials.

Thus, it is an object of the invention to provide an ecologically suitable means for managing organic wastes.

It is another object to provide an improved process for the efficient, substantially odorless, biological transformation of animal wastes, toxins or other organic waste materials economically into suitable materials for recycling to the environment.

It is a further object of the present invention to provide a process to create a biologically active, ecologically beneficial, substantially odorless humus material through the bioconversion of organic waste, particularly animal excrement It is a still further object of the present invention to provide a process to create a biologically active, and/or a nutrient-rich, organic soil.

It is yet another object of the present invention to provide an efficient process that permits biological treatment of higher waste loads in existing treatment facilities and allows for reduced size facilities.

These and other objects will be apparent from the following description of the invention.

SUMMARY OF THE INVENTION

The present invention relates to a low oxygen, high microorganism mass, organic waste bioconversion process and the product of this process. In the process organic waste, such as animal excrement, containing significant concentrations of potentially polluting or environmentally harmful substrates, is biologically transformed into an ecologically beneficial, nutrient rich, valuable organic humus material.

Applicants have discovered that if specific environmental conditions are maintained in a biological wastewater treatment process, a natural microbial community will evolve such that it will seek a state of dynamic equilibrium within a plurality of desired ecological niches. Applicants have surprisingly determined that a high mass of microorganisms can be maintained in combination with a low dissolved oxygen concentration resulting in a substantially odorless, efficient bioconversion of organic waste.

The process provides for simultaneous treatment and stabilization of the organic waste, is substantially odorless and is more efficient than present biological treatment systems. The resulting humus material has commercial value, is of pleasant odor and can be safely maintained in open storage without significant migration of compounds. The process also manages water, which may have been combined with animal waste to optionally provide a nutrient rich aqueous fertilizer, which can be used to irrigate crops, or as a clean, generally low nutrient liquid, suitable for discharge to a water body.

This substantially odorless bioconversion of organic waste results, in part, from the presence of diverse populations of microorganisms in the treatment process. Although not limited to these specific populations, the low oxygen bioconversion process of the present invention is believed to be the result of the presence, in significant quantities, of four microbial populations including facultative heterotrophic fermentors, autotrophic nitrifiers, facultative heterotrophic denitrifiers, and autotrophic ammonium denitrifiers, as well as other organisms that coexist in this engineered environment. Each microbial population contributes to the bioconversion of the organic waste to nitrogen gas ($N_2$), carbon dioxide ($CO_2$), water vapor ($H_2O$), clean water and beneficial soil products (humus) containing nutrients such as phosphorous (P) and nitrogen (N). Odorous compounds are not a product of the bioconversion process.

The process comprises introducing organic waste containing sufficient concentrations of total BOD and organic nitrogen (measured as Total Kjeldahl nitrogen (TKN)) into an aqueous environment defined by at least one cell, tank, pond, unit or the like, wherein resides a diverse microbial community comprising large populations of facultative heterotrophic fermentors, autotrophic nitrifiers, facultative heterotrophic denitrifiers, and autotrophic ammonium denitrifiers as well as other classes of organisms that coexist in this engineered environment. The microbial populations within the aqueous environment are brought into contact with the substrate of the organic waste via some means, generally including agitation or mixing where the microorganisms exist as suspended populations within the aqueous environment, or by flowing the aqueous stream across settled or attached populations of organisms, or by other contact means.

The amount of microorganisms within the bioconversion process is monitored and generally controlled to remove cellulosic and large particulate solids and to concentrate microbes through the use of recycle loops, clarifiers or other solids concentrating or separating techniques. Excess microorganisms are removed from the aqueous environment via a variety of possible mechanisms to maintain favorable microbial health and viability. Preferably, all microorganisms removed from the aqueous environment are eventually harvested, dewatered and/or dried to create a nutrient rich humus product, and/or they may be combined with other materials to create a variety of differing nutrient rich humus products.

Dissolved oxygen concentrations are monitored within the aqueous environment and/or the aqueous stream and when necessary, oxygen is introduced into these environments at rates and in stoichiometric ratios so that the concentration of dissolved oxygen does not exceed 2.0 mg/l, and preferably does not exceed about 0.1 mg/l.

The increased rate of this low oxygen bioconversion process of the present invention allows for reduced size treatment facilities or makes it possible to treat a higher waste load in an existing system. Further, the production rate of the nutrient rich humus material is also believed to be enhanced.

DETAILED DISCLOSURE OF THE INVENTION

In the low oxygen bioconversion process of the present invention, evolution of a natural microbial community is encouraged under low dissolved oxygen conditions leading to a plurality of desirable ecological niches. Further, when the flowable organic waste stream to the bioconversion process of the present invention contains relatively high concentrations of total BOD and TKN, and the TKN to total BOD by weight ratio is relatively high, e.g. when the mass ratio of TKN:total BOD is more than about 1:20 by weight, and preferably more than about 3:20, the resulting low oxygen bioconversion process can be an effective processing approach for rapid, substantially odorless, bioconversion of the waste stream substrates.

Figure 1:
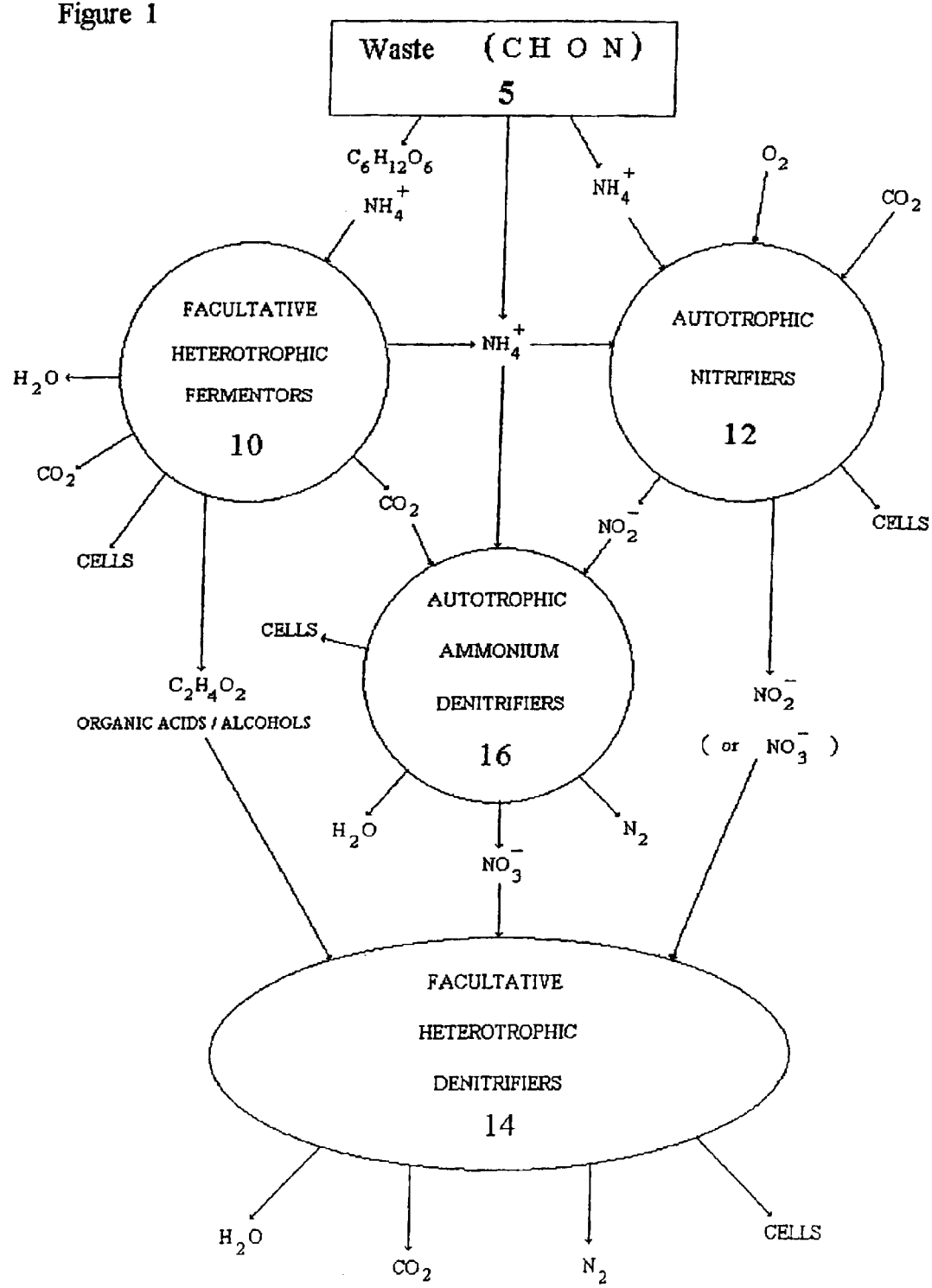
FIG. 1 comprises a schematic illustrating the predominant interrelationships of the organic waste, the major microbial groups responsible for bioconversion, the intermediate breakdown substances, and the final products of the process of the invention.

When the influent oxygen loading and the dissolved oxygen concentration in a biological treatment process are suitably regulated to maintain a dissolved oxygen concentration of less than about 2.0 mg/l, preferably less than about 0.1 mg/l in the aqueous portion of the process, a series of compatible, and overlapping and simultaneously occurring, ecological niches are formed. These niches so formed promote the growth and coexistence of desirable major populations of facultative heterotrophic fermentors, autotrophic nitrifiers, facultative heterotrophic denitrifiers, and autotrophic ammonium denitrifiers to the growth inhibition of other microbial populations such as heterotrophic aerobes, which usually dominate the bacteria present in conventional wastewater treatment processes. FIG. 1, comprises a schematic illustration of the interrelationships believed to exist between these microorganisms and the major substrates being affected during the bioconversion process.

With reference to FIG. 1, populations of facultative heterotrophic fermentors 10 will thrive on the organic wastes 5 available, while the growth of obligate aerobes and obligate anaerobes, that might otherwise be expected to compete for the carbon and energy sources, are suppressed by the very low dissolved oxygen concentrations maintained. There will generally be enough oxygen available to inhibit obligate anaerobes but not enough to allow the obligate aerobes to be competitive.

In typical biological treatment processes enough oxygen is supplied to the facultative heterotrophs for complete bioconversion of the carbon containing compounds. In the low oxygen bioconversion process of the present invention it is believed that the limitation of the oxygen concentration induces the facultative heterotrophs to shift from an oxidative metabolism to a fermentative metabolism. Thus, the facultative heterotrophic fermentors ferment the organics present to organic acids and/or alcohols instead of oxidizing them through oxidative phosphorylation to carbon dioxide and water.

The oxygen introduced into the process of the present invention is taken up by the autotrophic nitrifiers 12 to nitrify, generally by oxidizing to nitrite ($NO_2^-$) and/or nitrate ($NO_3^-$), the nitrogen containing compounds in the system. In a typical biological treatment process, the organisms with an oxidative metabolism take up the oxygen. Since the oxygen introduced into the process of the present invention appears to be readily taken up by autotrophic nitrifier 12 populations, simplified control systems can be used to control oxygen loading to promote nitrification in a low dissolved oxygen process, without promoting the competing growth of obligate aerobes and facultative heterotrophic microorganisms using oxidative phosphorylation. The desired dissolved oxygen concentration for the process of the present invention is below the point where the organisms using facultative fermentative pathways predominate over organisms using oxidative pathways. Applicants have found this dissolved oxygen concentration is less than 2.0 mg/l and preferably, is less than about 0.1 mg/l. Generally oxygen present in the process in excess of the requirements for nitrification by the autotrophic nitrifiers 12 will be used preferentially to support heterotrophic aerobic activity. Within limits, the scavenging action of these heterotrophic aerobes removes the excess oxygen and maintains the present invention's oxygen concentration at very low levels.

Surprisingly, the low oxygen process of the present invention is believed to also use very low oxygen concentrations to establish a population of facultative heterotrophic denitrifiers 14 that use the $NO_2^-$ and/or $NO_3^-$ produced by the autotrophic nitrifiers 12 as their electron acceptor instead of dissolved oxygen. These facultative heterotrophic denitrifiers 14 then convert the organic acids and alcohols produced by the facultative heterotrophic fermentors 10 and other waste stream organics present into $CO_2$ and $H_2O$ while reducing the $NO_2^-$ and/or $NO_3^-$ nitrogen to $N_2$. Sustaining low oxygen concentrations that are high enough to concurrently allow the autotrophic nitrifiers 12 to thrive and nitrify ammonium ($NH_4^+$) to $NO_2^-$ and/or $NO_3^-$ and low enough to establish populations of facultative heterotrophic denitrifiers 14 able to reduce $NO_2^-$ and/or $NO_3^-$ to $N_2$ is of benefit to the current invention. This low oxygen environment also allows the establishment of autotrophic ammonium denitrifiers 16 capable of using $NO_2^-$ to oxidize $NH_4^+$ to $N_2$ and a small portion of $NO_3^-$ in reducing $CO_2$ to cell material (biomass). Application of this concurrent or simultaneous nitrification and denitrification process results in a nutrient rich humus material made by a process for the substantially odorless biological treatment of solid and liquid organic wastes, particularly animal farm wastes.

Thus, referring to FIG. 1, applicants have found that controlling the amount of oxygen introduced into a biological treatment process comprising a waste stream 5 having a relatively high concentration of TKN and total BOD in a ratio of more than about 1:20 provides a strong niche for facultative heterotrophic denitrifiers 14. The organic acids and/or alcohols produced by the facultative heterotrophic fermentors 10, together with other organics present in the waste stream and dead microbial cells or cell fragments, will efficiently combine with the nitrite and/or nitrate produced by the autotrophic nitrifiers 12 to provide this strong niche for facultative heterotrophic denitrifiers 14 and autotrophic ammonium denitrifiers 16. The facultative heterotrophic denitrifiers 14, in turn denitrify the nitrite and/or nitrate to nitrogen gas while the autotrophic ammonium denitrifiers 16 oxidize $NH_4^+$ to $N_2$ as well and return $NO_3^-$ to the facultative heterotrophic denitrifiers 14. Ultimately, the organic waste is bioconverted to $N_2$, $CO_2$, $H_2O$, clean water and beneficial soil products. The low oxygen bioconversion process of the present invention, therefore, provides for substantially odorless, efficient, treatment of organic waste.

Table 1 below provides example stoichiometric relationships that illustrate the types of biochemical reactions that drive this process.

TABLE I

EXAMPLE STOICHIOMETRIC RELATIONSHIPS

1) Fermentation of glucose into acetic acid by facultative heterotrophic fermentors:
   $C_6H_{12}O_6 \rightarrow 3\ C_2H_4O_2$
2) Cell synthesis by fermenting glucose into acetic acid by facultative heterotrophic fermentors:
   $2\ C_6H_{12}O_6 + 2\ NH_4^+ + 2\ OH^- \rightarrow 2\ C_5H_7O_2N + C_2H_4O_2 + 8\ H_2O$
3) Observed cell yields when fermenting glucose into acetic acid by facultative heterotrophic fermentors:
   $1.00\ C_6H_{12}O_6 + 0.05\ NH_4^+ + 0.05\ OH^- \rightarrow 0.05\ C_5H_7O_2N + 3.025\ C_2H_4O_2 + 0.20\ H_2O$

TABLE I-continued

EXAMPLE STOICHIOMETRIC RELATIONSHIPS

4) Endogenously nitrifying ammonia to nitrite by autotrophic nitrifiers:
   $2\ NH_4^+ + 2\ OH^- + 3\ O_2 \rightarrow 2\ NO_2^- + 2\ H^+ + 4\ H_2O$
5) Cell synthesis by nitrifying ammonia to nitrite by autotrophic nitrifiers:
   $48\ NH_4^+ + 40\ HCO_3^- + 8\ OH^- + 20\ O_2 \rightarrow 8\ C_5H_7O_2N + 40\ NO_2^- + 40\ H^+ + 72\ H_2O$
6) Observed cell yields when nitrifying ammonia to nitrite with Nitrosomonas by autotrophic nitrifiers. USEPA, Manual: Nitrogen Control (1993), Office of Research and Development, EPA/625/R-93/010, Washington, DC:
   $1.0\ NH_4^+ + 1.44\ O_2 + 0.0496\ CO_2 \rightarrow 0.01\ C_5H_7O_2N + 0.990\ NO_2^- + 0.970\ H_2O + 1.99\ H^+$
7) Observed cell yields when oxidizing nitrite to nitrate with Nitrobacter by autotrophic nitrifiers (from USEPA 1993):
   $1.00\ NO_2^- + 0.00619\ NH_4^+ + 0.031\ CO_2 + 0.0124\ H_2O + 0.50\ O_2 \rightarrow 0.00619\ C_5H_7O_2N + 1.00\ NO_3^- + 0.00619\ H^+$
8) Observed cell yields for the overall nitrification reaction of ammonia to nitrate by autotrophic nitrifiers (from USEPA 1993):
   $1.00\ NH_4^+ + 1.89\ O_2 + 0.0805\ CO_2 \rightarrow 0.0161\ C_5H_7O_2N + 0.952\ H_2O + 0.984\ NO_3^- + 1.98\ H^+$
9) Endogenously denitrifying nitrite to nitrogen gas using acetate by facultative heterotrophic denitrifiers:
   $3\ C_2H_4O_2 + 8\ NO_2^- + 8\ H^+ \rightarrow 4\ N_2 + 6\ CO_2 + 10\ H_2O$
10) Cell synthesis by denitrifying nitrite to nitrogen gas using acetate by facultative heterotrophic denitrifiers:
    $95\ C_2H_4O_2 + 32\ NH_4^+ + 40\ NO_2^- + 8\ H^+ \rightarrow 32\ C_5H_7O_2N + 20\ N_2 + 30\ CO_2 + 146\ H_2O$
11) Observed cell yields when denitrifying nitrite to nitrogen gas using methanol by facultative heterotrophic denitrifiers (from USEPA 1993):
    $1.00\ NO_2^- + 0.67\ CH_3OH + 0.53\ H_2CO_3 \rightarrow 0.04\ C_5H_7O_2N + 0.48\ N_2 + 1.23\ H_2O + 1.00\ HCO_3^-$
12) Endogenously and autotrophically denitrifying ammonium to nitrogen gas using nitrite:
    $8\ NH_4^+ + 23\ NO_2^- + 6\ H^+ \rightarrow 11\ N_2 + 9\ NO_3^- + 19\ H_2O$
13) Cell synthesis when autotrophically denitrifying ammonium to nitrogen gas using nitrite:
    $2\ NH_4^+ + 27\ NO_2^- + 10\ HCO_3^- + 10\ H^+ \rightarrow N_2 + 25\ NO_3^- + 2\ C_5H_7O_2N + 5\ H_2O$
14) Observed cell yields for the autotrophic denitrification of ammonium to nitrogen gas using nitrite as an electron acceptor:
    $NH_4^+ + 1.32\ NO_2^- + 0.066\ HCO_3^- + 0.126\ H^+ \rightarrow 1.02\ N_2 + 0.26\ NO_3^- + 0.066\ CH_2O_{0.5}N_{0.15} + 2.03\ H_2O$ Reaction numbers 1, 2 and 3 are examples of fermentation processes performed by the facultative heterotrophic fermentors 10 using glucose ($C_6H_{12}O_6$) as the model carbon source and acetic acid ($C_2H_4O_2$) as the model product. Reaction 1 shows the general fundamental relationship for the endogenous energy producing reaction of the fermentation. Reaction 2 shows the general fundamental relationship for the coupling of energy production with the synthesis of a microbial biomass (represented as $C_5H_7O_2N$). Reaction 3 shows how these two reactions are combined in actual operating conditions with experimentally observed cell yields. Although the reactions shown use glucose and acetic acid, as known by those of ordinary skill in the art, many other compounds may be substituted. For example carbohydrates, proteins celluloses, and/or other organic compounds containing oxygen may be substituted for the glucose and ethanol, lactic acid, propionic acid, butyric acid, or other organic acids, alcohols, aldehydes, and the like may be substituted for the acetic acid. These types of compounds along with amino acids, peptides, nucleotides, and other compounds contained in the influent waste stream and/or resulting from microbial cell death and lysis are known to serve as substrates similar to the acetic acid shown in the denitrification pathways represented by reaction numbers 9 and 10 and the methanol shown in the pathway represented by reaction 11.

Reaction numbers 4, 5, and 6 depict the reactions for the nitrification of ammonia by the autotrophic nitrifiers 12. Reaction 4 shows the general fundamental relationship for the endogenous energy producing reaction in which ammonia is nitrified to nitrite. Reaction 5 shows the general fundamental relationship for the coupling of reaction 4 with microbial cell synthesis. Reaction 6 illustrates how the combination of reactions 4 and 5 describes the observed yields of microbial cells that are synthesized during the nitrification of ammonia to nitrite by Nitrosomonas type bacterial species. Conventional nitrification processes employ a second step for the nitrification of nitrite to nitrate by Nitrobacter type bacterial species and this pathway may be present in the process of the current invention to varying degrees depending on the specific dynamic operating conditions imposed. In contrast, the process of the present invention utilizes facultative heterotrophic denitrifiers 14 and autotrophic ammonium denitrifiers 16 to denitrify the nitrite to $N_2$. However, if nitrate were present or produced in the process of the present invention, the facultative heterotrophic denitrifiers 14 would denitrify it to $N_2$ as well. Reaction 7 shows this process relative to observed yields of microbial cells and reaction 8 shows the combined nitrification of ammonia to nitrate (reaction numbers 6 and 7), again relative to observed yields of microbial cells.

Similarly, the reactions of the facultative heterotrophic denitrifiers 14, reaction numbers 9, 10, and 11, show the bioconversion of nitrite (similar reactions could be used to show the bioconversion of nitrate) to $N_2$ gas. This is illustrated using general fundamental relationships, endogenously (9), and during cell synthesis (10), when using acetate as an electron acceptor. In reaction 11 the denitrification is shown relative to observed yields of microbial cells and uses methanol ($CH_3OH$) as an electron acceptor.

Reactions 12, 13, and 14 portray the autotrophic conversion of ammonium and $CO_2$ to nitrate and $N_2$ by the autotrophic ammonium denitrifiers 16. As before, reaction 12 shows the endogenous process, reaction 13 shows the process relative to cell synthesis, and reaction 14 shows the combined process relative to observed cell yields. In reaction 14, the microbial cell mass was represented as $CH_2O_{0.5}N_{0.15}$ instead of $C_5H_7O_2N$ to reflect its publication reference. Astrid A. Van de Graaf, Peter de Bruijn and Lesley A. Robertson, *Autotrophic Growth of Anaerobic Ammonium-Oxidizing Micro-organisms in a Fluidized Bed Reactor*, Microbiology, 142:2187–96 (1996).

The nitrate produced in the autotrophic ammonium denitrification reactions is consumed by denitrification reactions very similar to those shown in reactions 9, 10, and 11.

In order to attain and maintain dynamic equilibrium of ecological niches, it is important that enough growing microorganisms be present in the total treatment system so that the population as a whole can evolve to optimally populate the four ecological niches in a reasonable time period. Many waste streams are very complex, containing many different chemical constituents, many of which contribute to both BOD and TKN, consequently there are many possible fermentative pathways that the facultative heterotrophs can use. The waste stream also provides even more possible substrates for the denitrification process including dead cells and cell fragments as well as the fermented products of facultative heterotrophic fermentors 10. A large dynamic microbial population can evolve to optimally fit the available distributions of materials in a waste stream and then can evolve to maintain this optimal fit as the waste stream and other environmental conditions, such as temperature, continually change. Thus, maintenance of a sufficient population of microorganisms provides the system with efficient adaptability to system changes normally associated with wastewater treatment systems. The larger the total population of microbes growing at a given average growth rate, the larger the number of mutations that will occur. Thus, the process of the present invention benefits from a sufficient quantity of microorganisms to maintain a sufficient quantity of mutations thereby providing for an efficient, dynamic bioconversion process.

When optimizing the evolutionary criteria of a population of microbes, there is a preferred minimum population size and growth rate. This is expressed as both a minimum mass of microbes and as a function of total BOD and TKN loading. Generally the process of the present invention requires a minimum population of about $10^{15}$ microbes or more, with an average doubling time of about 30 days or less. A less efficient process of the invention can be achieved with a greater quantity of microbes regenerating at a slower rate (i.e. a larger doubling time). Preferably, the sustained minimum operating population is comprised of from about $10^{17}$ to about $10^{18}$ microbes with a doubling time of ten days or less to insure the presence of an adequate biomass to treat the waste stream. In addition to these minimum population size or mass criteria, it is also preferred to have at least $10^{13}$ microbes with a doubling period of 30 days or less, per pound of influent total BOD or TKN. These two biomass parameters can alternatively be expressed as more than about $10^{15}$ base pair replications per second for the minimum population and about $10^{17}$ base pair replications per pound of total BOD or TKN loaded into the treatment process. Most preferred values run about 100 times these figures.

Thus, the beneficial results of the low oxygen bioconversion process of the present invention are believed to be a result of three general considerations. First, the process benefits from the presence of a dynamically responsive, diverse, microbial community in sufficient numbers or mass of microorganisms, growing at sufficient rates in the process to allow the microbial community to adapt in a workable time frame to achieve a dynamic equilibrium. Second, organic and nitrogen loading allows an energy, carbon and nitrogen balance to occur between the microbial populations of facultative heterotrophic fermentors, 10, autotrophic nitrifiers 12, facultative heterotrophic denitrifiers 14 and autotrophic ammonium denitrifiers 16. Third, control of dissolved oxygen levels and/or oxygen additions creates and maintains the populations of facultative heterotrophic fermentors 10, autotrophic nitrifiers 12, facultative heterotrophic denitrifiers 14 and autotrophic ammonium denitrifiers 16.

The low oxygen bioconversion process of the present invention is one in which the organic constituents contained in a waterborne waste stream, such as total BOD and TKN are bioconverted to a mixture of microbial cells, very stable refractory organic humus solids and inert material, inert nitrogen gas, carbon dioxide, and water.

In a process of the present invention, a BOD and TKN containing waste stream, having a TKN:total BOD ratio of about 1:20 or more is introduced into an aqueous environment containing a microbial community comprising large populations of facultative heterotrophic fermentors 10, autotrophic nitrifiers 12 facultative heterotrophic denitrifiers 14 and autotrophic ammonium denitrifiers 16. The waste stream of BOD and TKN is brought into close contact with the microorganism populations by any suitable means, preferably by mechanically mixing and/or by flowing the aqueous stream across settled or attached populations of organisms. The aqueous environment of the process of the invention is generally contemplated as an open, bermed cell arrangement and is conveniently adaptable to automated operation. However, closed tanks, cells or units could be utilized for the aqueous environment. Oxygen is introduced into this environment at controlled rates and in specific stoichiometric ratios so that the concentration of dissolved oxygen is maintained less than about 2.0 mg/l and most preferably does not exceed about 0.1 mg/l. The aeration means could be accomplished via diffused aeration, mechanical mixers, surface mixers, surface atmospheric transfer, algal generation or other equivalent means.

Solids in the aqueous environment may be clarified by floating or sitting, thickened, centrifuged, separated or treated by other equivalent concentrating means and recycled to maintain the biomass requirements. Excess microorganisms may be harvested, dewatered, and/or dried and sometimes further combined with other materials to create a nutrient rich humus material that can be beneficially used.

Figure 2:
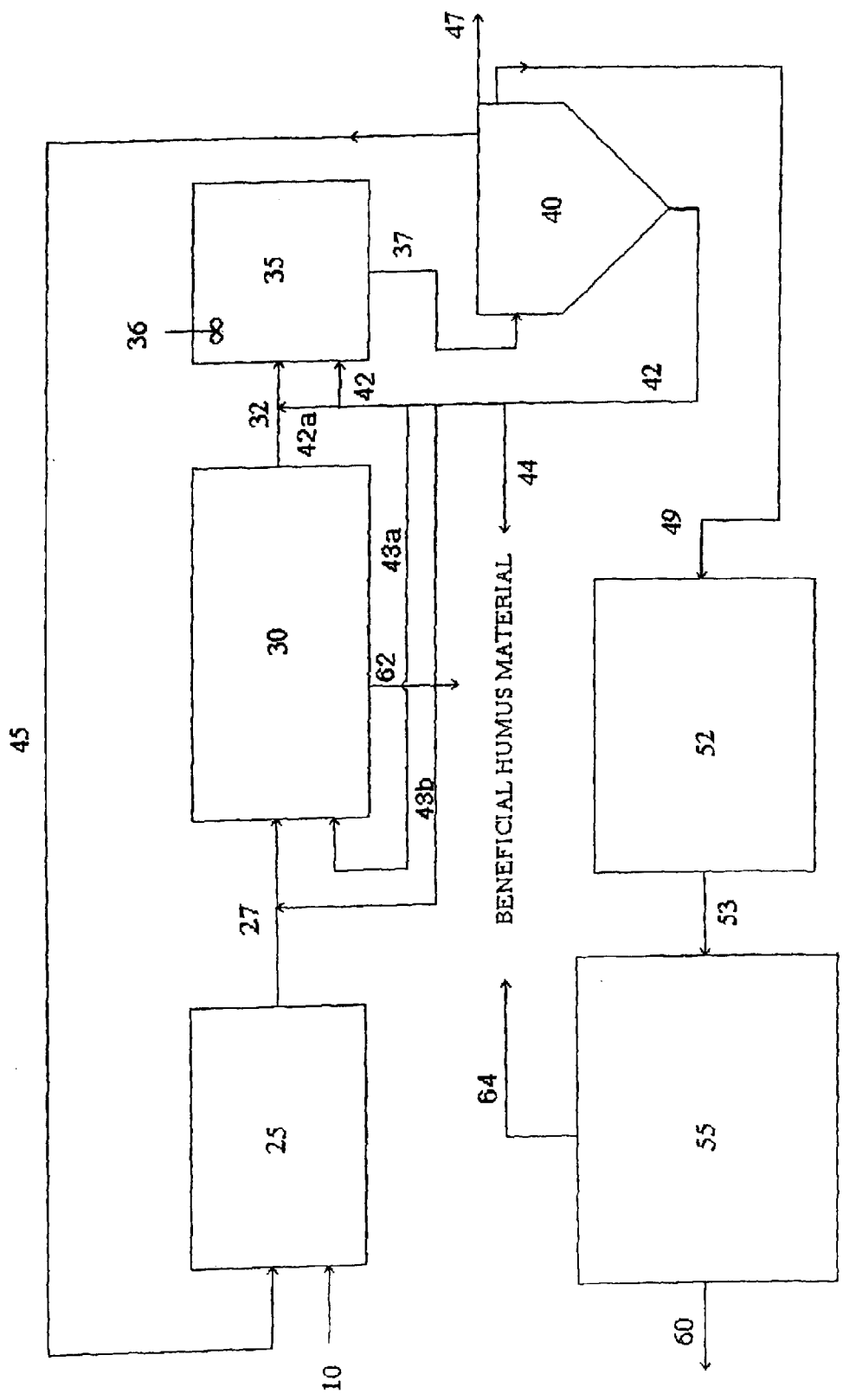
FIG. 2 comprises a flow diagram of an embodiment of the process of the invention for a typical installation for a dairy farm.

FIG. 2 illustrates a first embodiment of the invention in a dairy farm treatment system. Wash water, liquid wastewaters 10 and/or recycled treated flushing water 45 is used to transport and slurry the animal excrement and wastes 27 from an animal confining barn, penning area or the like 25 to a solids concentrating treatment unit 30 which acts a multi-zone composting, solids dewatering and bioconversion means. The solids concentrating treatment unit 30, could be a plurality of holding cells or zones, surrounded by containment berms which are generally arranged so that individual or sets of cells may be periodically interrupted from the process so that their contents may be harvested, dewatered and/or dried for recovery of bioconverted organic humus. The principle function of the solids concentrating treatment unit 30 is to convert excess biomass to an ecologically beneficial humus material suitable for recovery. The process of the present invention, however, is not limited to the bermed holding cell. Other solid concentrating treatment units 30, both open and closed to the surrounding environment, such as clarifiers, flotation units, screens, filter presses, heat dryers, and the like could be used in addition to or in place of the bermed holding cell.

The solids concentrating treatment unit liquid effluent stream 32 is treated by a microorganism growth managing and enhancing unit 35 wherein microbes are grown, enhanced, modified and/or concentrated. The principle function of a microorganism growth managing and enhancing unit 35, is to promote the growth of biological microorganisms which entrain the soluble material of the waste stream and continue the bioconversion process. A microorganism growth managing and enhancing unit 35 generally comprises a suitably sized pond environment, tank, cell or the like.

The dissolved oxygen concentration and the amount of microorganisms in the aqueous portion of the process stream are monitored; specifically low dissolved oxygen and high microorganism quantity are sought to be maintained. Dissolved oxygen concentrations are controlled by a means of aeration 36 that could include a dissolved oxygen aeration system, some type of mechanical mixers, enhanced natural surface aeration or the like. The biomass quantity is maintained by a biomass concentrating means 40 that concentrates the liquid effluent stream 37 from the microorganism growth managing and enhancing unit 35 and/or recycles it.

The treated microorganism growth managing and enhancing unit liquid effluent stream 37 is directed to a biomass concentrating means 40 such as a clarifier wherein the biomass is settled and/or floated, thickened, separated and/or concentrated so that higher concentrations of microbes can be recycled back to the microorganism growth managing and enhancing unit 35. Other treatment units besides clarifiers could be used to accomplish the biomass concentrating means 40. For example, settling tanks, cyclones, centrifuges, filter presses, filters, screens, and/or membranes could be used. Concentrated biomass sludge containing large quantities of living microbes is recycled via stream 42 back to the influent end of the microorganism growth managing and enhancing unit 35 to maintain biomass quantity therein. Alternatively, the concentrated biomass sludge could be directed to and combined with the solids concentrating treatment unit liquid effluent stream 32, via stream 42a, before entering the microorganism growth managing and enhancing unit 35, it could be directed, via stream 43a, to the influent end of the solids concentrating treatment unit 30, it could be directed to and combined with via stream 43b, the slurried animal excrement and wastes 27 before entering the solids concentrating treatment unit 30, and/or it could be removed from the system via stream 44 for conversion into a beneficial humus material or other uses. The liquid effluent from the biomass concentrating means 40 (for example the overflow if a clarifier) could be used either as flush or wash water directed back via stream 45 to the barn, penning area or the like 25, and/or it could be discharged from the system via stream 47 as a nutrient rich aqueous fertilizer for crops and/or it could be directed via stream 49 for further treatment prior to irrigation or discharge.

Ultimately, the process parameters, specifically the biomass and dissolved oxygen concentration parameters, are maintained in the aqueous portion of the treatment system. In FIG. 2, the aqueous portion includes the flowable portion of the solids concentrating treatment unit 30, the microorganism growth managing and enhancing unit 35 and the biomass concentrating means 40.

In an alternative embodiment, the liquid effluent from the biomass concentrating means 40 undergoes further treatment. Clarified, settled, or separated effluent in stream 49 undergoes further bioconversion in an additional microorganism growth managing and enhancing unit 52. The additional microorganism growth managing and enhancing unit effluent is directed, via stream 53, for further solids, total BOD and nutrient removal such as by means of a polishing unit 55.

A polishing unit 55 generally constitutes a flooded vegetative complex and preferably comprises a wetlands environment or overland flow system made up of plants and microorganisms suitable for capturing the relatively small quantity of nutrients contained in the effluent discharged from a microorganism growth managing and enhancing unit 52. In a preferred embodiment, the polishing unit 55 generally comprises multiple, distinct cells arranged such that liquid discharged from a microorganism growth managing and enhancing unit can be directed thereto in a variable and controlled manner. An especially preferred polishing unit generally comprises a suitable low lying field with a bermed perimeter and cross berms which create two or more liquid holding cells, wherein effluent from a microorganism growth managing and enhancing unit can be variably directed to one or more cells of the polishing unit. The liquid effluent from a polishing unit is sufficiently treated for reuse, wetland creation or maintenance, or discharge to a water body via stream 60. As for the solids concentrating treatment unit (stream 62), a polishing unit 55 could be removed from service and the solids within could be harvested 64 and dried for humus material.

Alternately, conventional wastewater treatment processes could be used to further treat the stream discharged from the biomass concentrating means 40 via stream 49, or from an additional microorganism growth managing and enhancing unit 52 via stream 53, to the quality desired before recycle, reuse or discharge 60. In yet another embodiment, the process of the invention could be modified to speed up the bioconversion process by removing solids that are digested at a slower rate by the microorganisms (i.e. cellulosic and course organic and inorganic solids) at the beginning of the process. This can be accomplished by replacing solids concentrating treatment unit 30 with a solids separating means and adding another means of concentrating the microorganism growth managing and enhancing unit liquid effluent stream 37 to achieve the processes biomass requirements.

Figure 3:
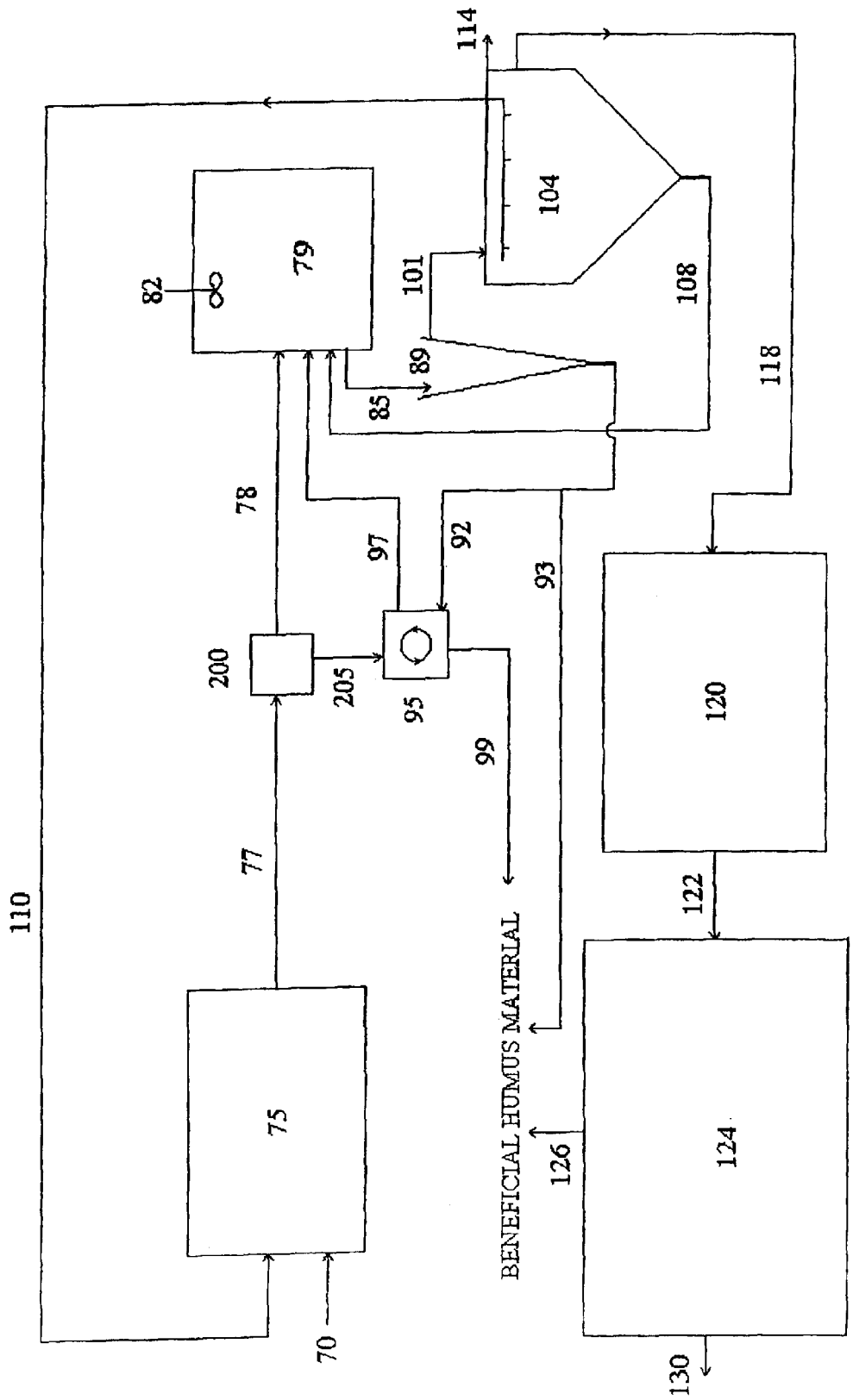
FIG. 3 comprises a flow diagram of another embodiment of the process of the invention for a higher rate dairy farm system.

As shown in FIG. 3, wash water, liquid wastewaters 70 and/or recycled flushing water 110 are passed through an animal confining barn, penning area or the like 75. The slurried animal excrement waste is directed to a solids separating means 200, to separate cellulosic solids and other course organic and inorganic solids from soluble and finely suspended solids. The separated stream is then directed to a microorganism growth managing and enhancing unit 79 via stream 78 wherein microbes are grown, enhanced, modified and/or concentrated. The course, mostly cellulosic solids, removed by the solids separating means 200 are delivered by stream 205 to a mixer 95 for further processing or may be removed from the system for other uses.

The dissolved oxygen concentration and the amount microorganisms in the aqueous portion of the process stream are monitored for compliance with process parameters, specifically low dissolved oxygen and high microorganism quantity. Dissolved oxygen concentrations are controlled by a means of aeration 82 that could include a dissolved oxygen aeration system, some type of mechanical mixers or the like. The biomass quantity in the system is maintained by concentrating and recycling the effluent from the bioreactor.

The treated microorganism growth managing and enhancing unit liquid effluent stream 85 is directed to a biomass concentrating means 89 wherein the biomass is settled, thickened, separated and/or concentrated. Further solids treatment for the concentrated biomass from the biomass concentrating means 89 is achieved by directing the solids via stream 92 to a solids mixer 95. Alternatively, these solids may be harvested via stream 93 for use as soil for plant growth product additives, or for feed and food stocks or raw materials for such processed stocks. The solids mixer 95 mixes the concentrated biomass from the biomass concentrating means 89 delivered to it via stream 92, with the cellulosic and other course solids separated from stream 77 by the solids separator 200 that is delivered to the mixer via stream 205. Excess liquid is directed back to the microorganism growth managing and enhancing unit 79 via stream 97 and the mixed solids are removed via stream 99 and harvested, dewatered and/or dried to create a nutrient rich humus product.

The liquid effluent from the biomass concentrating means 89 is directed via stream 101 to a solids clarifier 104 for further concentration of the solids. Concentrated biomass sludge from the solids clarifier is directed via stream 108 back to the influent end of the microorganism growth managing and enhancing unit 79 to maintain biomass quantity therein. The liquid effluent from the solids clarifier could either be used as flushing or wash water directed back via stream 110 to the barn, penning area or the like 75, and/or it could be used discharged from the system via stream 114 as a nutrient rich aqueous fertilizer for crops and/or it could be directed via stream 118 for further treatment prior to reuse or ultimate surface discharge into a wetland or water body, or by subsurface discharge to an underground aquifer, via stream 130.

The system parameters, specifically the biomass and dissolved oxygen concentration are maintained in the microorganism growth managing and enhancing unit 79, the biomass concentrating means 89 and the clarifier 104 in this embodiment.

Another embodiment includes further treatment for clarified, settled, or separated effluent in an additional microorganism growth managing and enhancing unit 120. The microorganism growth managing and enhancing unit effluent is directed, via stream 122, for such as by means of a polishing unit 124. The liquid effluent from a polishing unit is sufficiently treated for recycle, reuse or discharge to a created, restored, enhanced, or constructed wetland or surface or subsurface water body via stream 130.

The nutrient rich humus of the invention is a microorganism active, by-product of the biomass concentrating means 89, solids mixer 95 and/or polishing unit 124 via stream 126.

Alternately, conventional wastewater treatment processes could be used to further treat the stream discharged from the solids clarifier 104 via stream 118, or from the additional microorganism growth managing and enhancing unit 120 via stream 122, to the quality desired before recycle, reuse or discharge 130.

The process of the invention could be further modified for other applications. For example, a standard hog farm system according to the present invention might advantageously incorporate an additional microorganism growth managing and enhancing unit in between the barn and the solids concentrating unit.

A process of the present invention may include a chemical addition/mixing subzone within a microorganism growth managing and enhancing unit or positioned in one or more cells of a solids concentrating treatment unit. Such a subzone could be positioned for mixing in chemicals that could be added to the process of the invention to essentially chemically conduct the role of the facultative heterotrophic fermentors and/or for mixing in metallic salts or organic polymers for the removal of precipitable phosphorus and other materials. Preferably, such a subzone is positioned at the influent end of a microorganism growth managing and enhancing unit or solids concentrating treatment unit. In such an embodiment, although the facultative heterotrophic fermentors would still be present in the process of the invention, albeit in smaller quantities, chemicals can be added to the process of the invention to supply an electron acceptor for the autotrophic nitrifiers for nitrification of $NH_4^+$. For example, acetic acid, methanol, or other organic acids or alcohols could be used. Preferred metallic salts for this purpose include ferrous sulfate, ferric chloride, alum and the like which can combine with suspended and/or solubilized phosphorus compounds to form a precipitate and/or associated chemical complexes.

In an another embodiment, a system using the process of the invention may have one or a series of closed vessels, the vessels being initially loaded with a microbial population of about $10^{15}$ microbes or more, and being in fluid communication with an influent aqueous waste stream having a concentration of total BOD and a ratio of TKN:total BOD of more than about 1:20. The vessel includes means for delivery of oxygen thereto, preferably comprising a combined mechanical mixing and aeration means, arranged to be automatically enabled as desired.

The process of the present invention could further comprise a plurality of sensing means, arranged to sense dissolved oxygen and/or oxygen loading, biomass and/or influent stream temperature and rates of influent flow, each being interconnected to a central processing unit. Sensing means for example, may include oxidation/reduction potential (redox), pH, conductivity, temperature and/or combinations thereof alone or together with other sensors, which enable data indicative of dissolve oxygen concentration and/or availability. Other sensing means which relate to the functionality, stability, and/or performance of the systems as a whole or the microbial biomass, may also be used in the process of the invention. These might include liquid sensors, such as specific ion electrodes for a variety of ions including ammonium ions, and gas sensors which could detect ammonia and other nitrogen containing gaseous compounds, hydrogen sulfide, mercaptans, and a variety of volatile organic compounds such as the acetic, butyric, and propionic acids commonly associated with ruminant manures.

A central processing unit such as a computer, typically comprising micro-controller means, data distribution means, data storage means and comparator/computing means may be used. Data from at least one or a plurality of sensing means is typically routed to the micro-controller means wherein it is digitized for use by the central processing unit and provided to the distribution means for distribution to the comparator/computing means and/or data storage means. The comparator/computing means generally compares data received from the distribution means with previously stored data and analyzes, computes and/or confirms system parameters within the biomass, enabling, disabling or varying oxygen loading and/or mixing and/or recycle flows and/or influent waste stream flow in accord with preset and/or continually calculated system parameters. A monitor and/or printer provides visual and/or hard copy confirmation of status and the central processing unit may be interconnected to a remote station to enable remote monitoring and remote system modification as desired.

In a further preferred embodiment, a vessel will automatically discharge suitably bioconverted product for subsequent processing and/or aqueous stream for recycle and the like, and retain an appropriate quantity of biomass containing the appropriate mass of microbes for managed treatment of the aqueous influent stream.

The efficiency of the process of the present invention is best described by example in a typical wastewater application of the present invention, 100 pounds of TKN and 260 pounds of total BOD, can be treated with 260 pounds of oxygen, to produce 105 pounds of cells while discharging essentially no TKN in the effluent and predominately discharging $N_2$ and $CO_2$ to the atmosphere. In comparison, an advanced wastewater treatment plant using costly energy intensive nitrogen removal technology would require more than 600 pounds of oxygen to achieve the same discharge criteria. In further comparison, a conventional secondary treatment wastewater plant, would use about the same 260 lbs. of oxygen as the process of the invention, just to treat the BOD, while a significant part of the influent TKN nitrogen would be discharged to the atmosphere as ammonia gas, with most of the remainder of TKN being discharged in the effluent stream as ammonium ions and TKN.

The process of the present invention is applicable to multiple diverse wastewater streams. For example, the process is applicable to municipal wastewater streams containing a total BOD of about 100 to about 400 mg/l and a TKN of about 10 to about 50 mg/l; to flushed wastewater from hog, dairy and/or other animal holding area having a total BOD of about 500 to about 10,000 mg/l and a TKN of about 100 to about 2,000 mg/l; and industrial, food processing and the like wastewater having a total BOD of about 400 to about 80,000 mg/l and a TKN of about 20 to about 10,000 mg/l. Additional application areas include the production of a microbial cell mass for single cell protein production from a variety of biodegradable materials, e.g. solid and/or waterborne, and appropriate nitrogen sources.

The nutrient rich humus of the invention is a settled and in some cases precipitated, microorganism active-product of the process. The humus comprises bioconverted organic waste containing stable nitrogen, phosphorus and potassium rich material, bound in an active microorganism matrix intermixed with fibrous cellulosic and/or other organic materials. The appearance of dried humus varies significantly from dried manure in that it is a deep brown, peat like or granular material, which readily mixes with soil, including clay, sand and the like. The material is substantially generally absent an offensive odor and has limited odor that is closely similar to that of rich topsoil. The material may be comminuted (ground, granulated, screened, milled) and generally contains few clumps. The material is generally hydrophobic in that it resists wetting, but once wetted it becomes hydrophilic in that it tends to hold water. The material appears to resist clumping even when wetted.

A preferred humus of the invention comprises from about 0.2 to about 6.0% nitrogen, about 0.1 to about 2.0% phosphorus and from about 0.1 to about 2.0% potassium on a dry weight basis, in stable form. The use of chemical precipitation and high rate processing can raise the nitrogen, phosphorus and potassium upper limits to 10% on a dry weight basis. Nitrogen, in the form of ammonia, is generally at 10% or less, and preferably at 3% or less of total nitrogen and quantities of calcium, manganese, magnesium, iron and sulfur are generally present. Though unstable nitrogen and phosphorus values are generally present in the humus of the invention, they appear to be in quantities so low as to constitute little or no environmental threat through aqueous dissolution and run-off but are available for uptake by plants. Thus, the humus of the invention is unique in that the nitrogen and phosphorus nutrient rich character thereof is in a form beneficial for enhancing the growth of vegetation within its environment, yet resistant to migration by rainfall, ground water flow and the like to pollution of aquifer, surface and groundwater accumulations.

The humus of the invention created from animal excrement could comprise other components which are defined by the animal feed supply, the animal from which the humus is generated, any bedding, parlor washwaters, cleaners, run-off and the like, or other materials which may be collected or added to the system for humus generation. Such other added components are synergistic and are intended to improve the efficacy of a particular humus of the invention for a particular use.

The organic matrix of the humus of the invention is rich in stabilized nutrient content and comprises dynamic macro and/or micro organisms and other components which appear especially predisposed to proactively adapt and interact with additive materials in an efficacious phenomena which can be managed to provide a host of further beneficial products.

Due to the maintenance of the process parameters in the desired ranges, a consistent quality of humus can be obtained. Waste may be collected from any convenient organic waste source such as dairy cows, sheep, goats and the like, feed lot cattle, swine, horses, zoo animals, poultry including chicken, turkeys, ducks and the like and even aquatic animals such as fish, frogs and alligators.

The process of the invention is managed to maximize the active, facultative heterotrophic and autotrophic biomass by continually generating genetic variations in its organisms to optimize microbial adaptability of the biomass to survive and thrive in varying environments. The humus harvested has an active microbial potential that appears to adapt to environmental changes with a host of interesting beneficial effects.

Thus, the humus of the invention which comprises captured and stabilized nutrients along with trace metals appears to adapt and capture toxic substrates or trace metals when produced from or mixed with a waste stream containing same. Microbial variations which appear to degrade cellulose and lignin are enhanced by microbial variations which appear to degrade other polymerized materials. Microbial variations which appear to capture and stabilize nutrients are enhanced by microbial variations which appear to promote seed germination and release of nutrients which increase crop yield and size of fruits, grains and vegetables.

The humus of the invention is generally processed after harvesting for both convenience of handling and enhancement of microbial activity. Generally, the humus of the invention is at least partially dried to reduce its handling weight by air drying, vacuum water removal, mild heat drying or the like and thereafter shredded, screened, pulverized or the like as may be desired. It is also possible to use other drying processes or techniques such as intense heat drying, forced air, or cyclonic drying. It should be understood however, that the humus of the invention need not be dried or further comminuted to be effective as a beneficial product in accord with the invention.

Partially dried and processed humus is easily mixed with other materials and has been found to be especially effective in providing an enhanced growth media when mixed with normal soils and top soils. When mixing the humus with normal soils it is preferred to use not more than about 1:2 parts by volume humus:soil and generally adequate nutrition content will be imparted to a soil at levels of about 1:3–7 parts by volume humus:soil. Generally when mixing with top soils the amount of humus can be reduced to about 1:4–12 parts by volume humus:topsoil.

The humus of the invention can also be effective in producing remediated growth soil media when mixed with clay, sand, silt, mud, soil, gravel, dust, mine tailings, dredge materials, depleted or spent soils and the like. New growth media can be created through mixtures of the humus with sawdust, paper, cardboard, polymers, plastics, waste organics or agricultural materials such as bagasse, hulls, stalks, stems, waste hay, leaves, shells, cotton or rayon dust and the like.

It is contemplated that the humus of the invention can also be used in aquatic growth environments wherein the humus alone or mixed as above indicated with other media is added to a flooded environment for plant growth. This could be used for the creation, restoration, or enhancement of wetlands.

Though the humus of the invention provides enhanced nutrient content to promote germination and growth of plants, it has also been found to be effective in suppressing plant disease and providing plant pest resistance. Humus which is harvested direct from the process of the invention is generally too nutrient rich to be a suitable plant growth media standing alone, and is generally mixed with an appropriate material as above described to provide a desirable medium. Interestingly however, such directly harvested humus appears to provide a good top cover for plants which have been seeded or germinated in under soils, appearing to provide resistance from the spread of disease bacteria and the like while providing a rich nutrient source which can be utilized by the root structure of the existing plant.

The humus of the invention can also be an effective feed component. Depending upon the animal source of the waste used to generate the humus of the invention, the humus can be of beneficial utility as a feed stock and/or additive. For example, the humus produced from the waste from typical swine feed lot operations generally comprises protein content which appears to define and characterize a delivery vehicle for nutrients, trace elements and the like for feed stock utility.

Thus, humus generated from barn and manure waste from a trough fed dairy cow or feed lot operation comprises an active organic matrix which may be characterized differently from that of a grazing fed dairy cow operation, which is different from a hog feed lot operation and/or chicken or turkey lot operation. Though each such operation produces a nutrient rich humus which has general applicability for plant growth, each operation also results in a humus containing other components which generally contribute to an individual humus being particularly suitable for specific utilities such as enhanced germination and growth of specific plants and/or remediation of specific soils and/or characterization as foodstuffs or feed additives. The humus of the invention can be modified to achieve specific objectives by introducing various materials into the influent flush waters to the process or into various other of the bioreactor or ecoreactor or other components of the process. The nature of the added material and the manner and location of its addition will influence the adaptive and biodynamic character of the process and the resulting humus or other byproduct material. This can be managed to achieve a variety of desirable end product uses and functions.

We claim:

1. An organic humus material comprising a substantially odorless material created by harvesting solids from the aqueous environment of a substantially odorless, biological treatment process performing simultaneous nitrification and denitrification on organic waste in said aqueous environment, wherein oxygen is added to maintain less than about 2.0 mg/l of dissolved oxygen.

2. The humus material of claim 1, mixed with at least one of clay, sand, silt, mud, soil, gravel, dust, mine tailings and dredgings, polymers, plastics or other inert or inorganic materials.

3. The humus material of claim 1, wherein said aqueous environment further comprises about $10^{15}$ or more biological microorganisms with an average doubling time of less than about 30 days.

4. The humus material of claim 1, wherein said aqueous environment further comprises biological microorganisms regenerating at a rate of more than about $10^{15}$ base pair replications per second.

5. The humus material of claim 1, mixed with at least one of clay, sand, silt, mud, soil, gravel, dust, mine tailings and dredgings, polymers, plastics or other inert or inorganic materials.

6. The humus material of claim 1, further comprising, on a dry weight basis, about 0.2 to 10.0% nitrogen, about 0.1 to 10.0% phosphorous and about 0.1 to 10.0% potassium.

7. The humus material of claim 6, wherein the nitrogen and phosphorous are in a stabilized form resistant to migration.

8. The humus material of claim 6, comprising, on a dry weight basis, less than about 6% nitrogen, less than about 2% phosphorous and less than about 2% potassium.

* * * * *